US012513840B2

(12) United States Patent
Tsorng et al.

(10) Patent No.: US 12,513,840 B2
(45) Date of Patent: Dec. 30, 2025

(54) APPARATUS FOR INSTALLING PCIE ADD-IN CARDS IN A COMPUTING SYSTEM

(71) Applicant: Quanta Computer Inc., Taoyuan (TW)

(72) Inventors: Yaw-Tzorng Tsorng, Taoyuan (TW); Jen-Jia Liou, Taoyuan (TW); Wei-Jie Chen, Taoyuan (TW); Chia-Lin Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 194 days.

(21) Appl. No.: 18/396,130

(22) Filed: Dec. 26, 2023

(65) Prior Publication Data

US 2025/0126732 A1 Apr. 17, 2025

Related U.S. Application Data

(60) Provisional application No. 63/589,858, filed on Oct. 12, 2023.

(51) Int. Cl.
*H05K 5/02* (2006.01)
*H05K 7/14* (2006.01)

(52) U.S. Cl.
CPC .......... *H05K 5/0286* (2013.01); *H05K 5/023* (2013.01); *H05K 5/0247* (2013.01); *H05K 7/1417* (2013.01)

(58) Field of Classification Search
None
See application file for complete search history.

(56) References Cited

U.S. PATENT DOCUMENTS

| 5,831,821 | A  | * | 11/1998 | Scholder | H05K 7/1429 |
|           |    |   |         |          | 361/679.58  |
| 6,958,916 | B2 | * | 10/2005 | Roesner  | H05K 7/1424 |
|           |    |   |         |          | 361/728     |
| 7,626,830 | B2 | * | 12/2009 | Fan      | G06F 1/185  |
|           |    |   |         |          | 361/752     |
| 8,072,781 | B2 | * | 12/2011 | Chang    | G11B 33/126 |
|           |    |   |         |          | 361/825     |
| 9,817,451 | B1 | * | 11/2017 | Wang     | G06F 1/187  |
| 10,324,886 | B2 | * | 6/2019 | Mühsam   | G06F 13/4081 |
| 12,238,886 | B2 | * | 2/2025 | Tsorng   | H05K 7/1487 |
| 2008/0100994 | A1 | * | 5/2008 | Fan    | G06F 1/185  |
|           |    |   |         |          | 361/679.02  |
| 2009/0073645 | A1 | * | 3/2009 | Tsai   | G06F 1/185  |
|           |    |   |         |          | 361/679.6   |

(Continued)

*Primary Examiner* — Xanthia C Relford
(74) *Attorney, Agent, or Firm* — NIXON PEABODY LLP

(57) ABSTRACT

A bracket for a computing device includes a bracket backwall having a height H1, a first bracket sidewall coupled to a first corner of the bracket backwall, and a second bracket sidewall coupled to a second corner of the bracket backwall. The first bracket sidewall has a height H2, The second bracket sidewall is coupled to a second corner of the bracket backwall. The second corner is opposite the first corner along a diagonal of the bracket backwall. The second bracket sidewall has a height H2. The bracket further includes a first PCIe securing tab extending from the first bracket sidewall towards the second bracket sidewall, and a second PCIe securing tab extending from the second bracket sidewall towards the first bracket sidewall. The height H1 is approximately equal to a sum of the height H2 and the height H3.

20 Claims, 14 Drawing Sheets

(56) References Cited

U.S. PATENT DOCUMENTS

| | | | | |
|---|---|---|---|---|
| 2011/0254414 A1* | 10/2011 | Li | ............................ | G06F 1/186 |
| | | | | 312/223.2 |
| 2012/0026674 A1* | 2/2012 | Aldridge | .................. | G06F 1/187 |
| | | | | 361/679.33 |
| 2015/0009617 A1* | 1/2015 | Yin | .......................... | G06F 1/186 |
| | | | | 361/679.32 |
| 2017/0105314 A1* | 4/2017 | Kim | .......................... | F28D 21/00 |
| 2017/0280578 A1* | 9/2017 | Hesse | ....................... | G06F 1/185 |
| 2022/0114130 A1* | 4/2022 | Lin | ........................ | G06F 13/4221 |
| 2023/0050441 A1* | 2/2023 | Li | ............................ | G06F 1/186 |
| 2023/0301012 A1* | 9/2023 | Lin | ........................ | H05K 7/1487 |
| | | | | 361/679.02 |

* cited by examiner

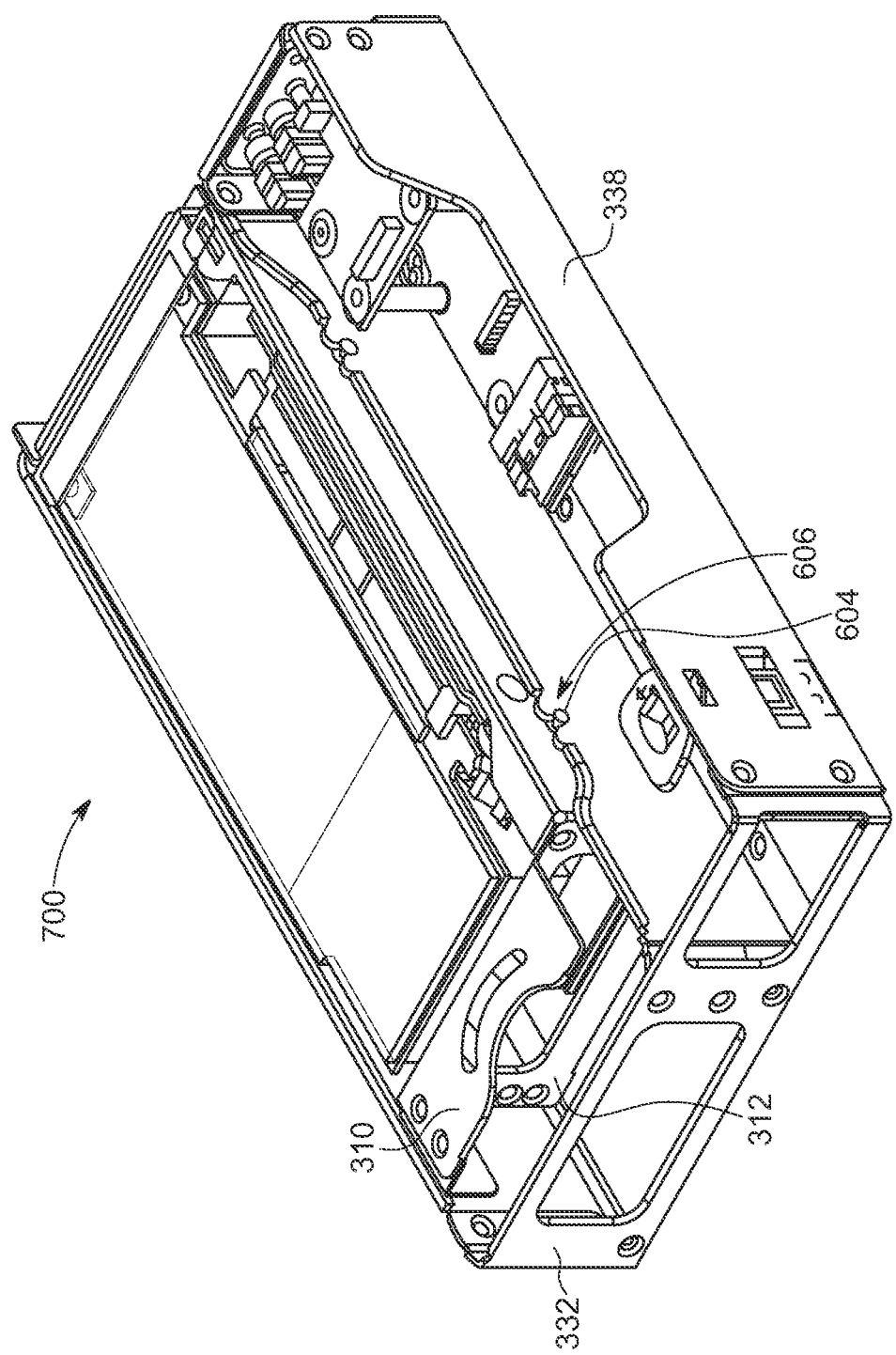

APPARATUS FOR INSTALLING PCIE ADD-IN CARDS IN A COMPUTING SYSTEM

CROSS-REFERENCE TO RELATED APPLICATIONS

This application claims priority from and benefit of U.S. Provisional Patent Application Ser. No. 63/589,858, filed on Oct. 12, 2023, titled "PCI-E Bracket Inter-Plug Structure Design on Server," which is hereby incorporated by reference herein in its entirety.

FIELD OF THE INVENTION

The present invention relates generally to systems and methods for installing Peripheral Component Interconnect Express (PCIe) add-in cards in a computing system.

BACKGROUND OF THE INVENTION

Servers are employed in a large number of applications ranging from high-performance computing to database storage. Servers enable many computing application solutions that have come to be relied upon. For example, servers may support mobile application solutions such as mobile mapping applications, mobile payment systems, text messaging, computation offloading, web browsing, etc. Mobile customers are usually unaware of extensive support being provided by servers in everyday use of their mobile devices. Although mobile customers may not consider server-side support in everyday use of mobile devices, components that make up the server affects performance of the server, and in some cases, features available for computing. Thus, servers sometimes need to be configured to include specific components or need to be upgradable to include specific components.

The components needed typically depend on service being provided. For example, a server may require installation of a PCIe card or swapping out a first PCIe card for a second PCIe card. PCIe cards can differ in physical size based on the functionality of the PCIe cards. Therefore, when a different sized PCIe card is installed in a computing system, fit of the PCIe card can be a problem. The present disclosure provides ways of reducing issues relating to fit of PCIe cards in computing systems.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a bracket for a computing device is provided. The bracket includes a bracket backwall having a height H1, a first bracket sidewall coupled to a first corner of the bracket backwall, and a second bracket sidewall coupled to a second corner of the bracket backwall. The first bracket sidewall has a height H2. The second corner is opposite the first corner along a diagonal of the bracket backwall. The second bracket sidewall has a height H2. The bracket further includes a first PCIe securing tab extending from the first bracket sidewall towards the second bracket sidewall and a second PCIe securing tab extending from the second bracket sidewall towards the first bracket sidewall. The height H1 is approximately equal to a sum of the height H2 and the height H3.

In an implementation, the bracket further includes a handle coupled to the bracket backwall. In an implementation, the bracket backwall includes an opening configured to receive a cable. In an implementation, the bracket further includes a first printed circuit board coupled to the first bracket sidewall, and the first printed circuit board is configured to receive a first PCIe card. In an implementation, the bracket further includes a second printed circuit board coupled to the second bracket sidewall, and the second printed circuit board is configured to receive a second PCIe card. In an implementation, the bracket further includes a cable coupled to both the first printed circuit board and the second printed circuit board. In an implementation, the height H2 or the height H3 is approximately the same as a thickness of a low profile PCIe card. In an implementation, the first bracket sidewall includes at least one knob for interfacing with a tray sidewall. In an implementation, the second bracket sidewall includes holes for coupling the bracket to a tray sidewall.

According to certain aspects of the present disclosure, a computing device is provided. The computing device includes a chassis, a motherboard coupled to the chassis, a tray removably coupled to the chassis, and a bracket removably coupled to the tray. The bracket includes a bracket backwall having a height H1, a first bracket sidewall coupled to a first corner of the bracket backwall, and a second bracket sidewall coupled to a second corner of the bracket backwall. The first bracket sidewall has a height H2. The second bracket sidewall has a height H3. The bracket further includes a first PCIe securing tab extending from the first bracket sidewall towards the second bracket sidewall and a second PCIe securing tab extending from the second bracket sidewall towards the first bracket sidewall. The height H1 is approximately equal to a sum of the height H2 and the height H3.

In an implementation, the computing device further includes a first printed circuit board coupled to the first bracket sidewall. The first printed circuit board is configured to receive a first PCIe card. The bracket further includes a second printed circuit board coupled to the second bracket sidewall. The second printed circuit board is configured to receive a second PCIe card. The bracket further includes a cable coupled to both the first printed circuit board and the second printed circuit board. In an implementation, the bracket backwall includes a first opening and the tray including a tray backwall having a second opening. The cable passes through both the first opening and the second opening to connect the first printed circuit board and the second printed circuit board to the motherboard. In an implementation, the bracket further includes a handle coupled to the bracket backwall. In an implementation, the first bracket sidewall includes at least one knob, and the tray includes a first tray sidewall having notches. The at least one knob is configured to be received in the notches. In an implementation, the second bracket sidewall includes at least one hole, and the tray includes a second tray sidewall. The second tray sidewall is coupled to the at least one hole of the second bracket sidewall via fasteners. In an implementation, the tray includes a first compartment and a second compartment. The first compartment houses the bracket and the second compartment houses a set of electronic components. In an implementation, the tray further includes a first tray sidewall separating the first compartment and the second compartment. The first tray sidewall is configured to couple to the first bracket sidewall.

According to certain aspects of the present disclosure, a method for installing a first PCIe card and a second PCIe card to a computing device is provided. The method includes inserting the first PCIe card in a bracket of the computing device from a first direction. The first PCIe card couples to a first printed circuit board, and the first printed circuit board couples to a first bracket sidewall of the bracket. The method further includes inserting the second PCIe card in the bracket from a second direction. The second direction is antiparallel to the first direction. The second PCIe card couples to a second printed circuit board, and the second printed circuit board is coupled to a second bracket sidewall of the bracket. The method further includes placing the bracket within a tray of the computing device, and placing the tray in the computing device.

In an implementation, the method further includes mechanically coupling the bracket to the tray using fasteners. In an implementation, the first bracket sidewall and the second bracket sidewall are coupled to a bracket backwall. The bracket backwall has a height H1, the first bracket sidewall has a height H2, and the second bracket sidewall has a height H3. The height H1 is approximately equal to a sum of the height H2 and the height H3.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 7C is a back perspective view of FIG. 7A.

DETAILED DESCRIPTION

Figure 1A:
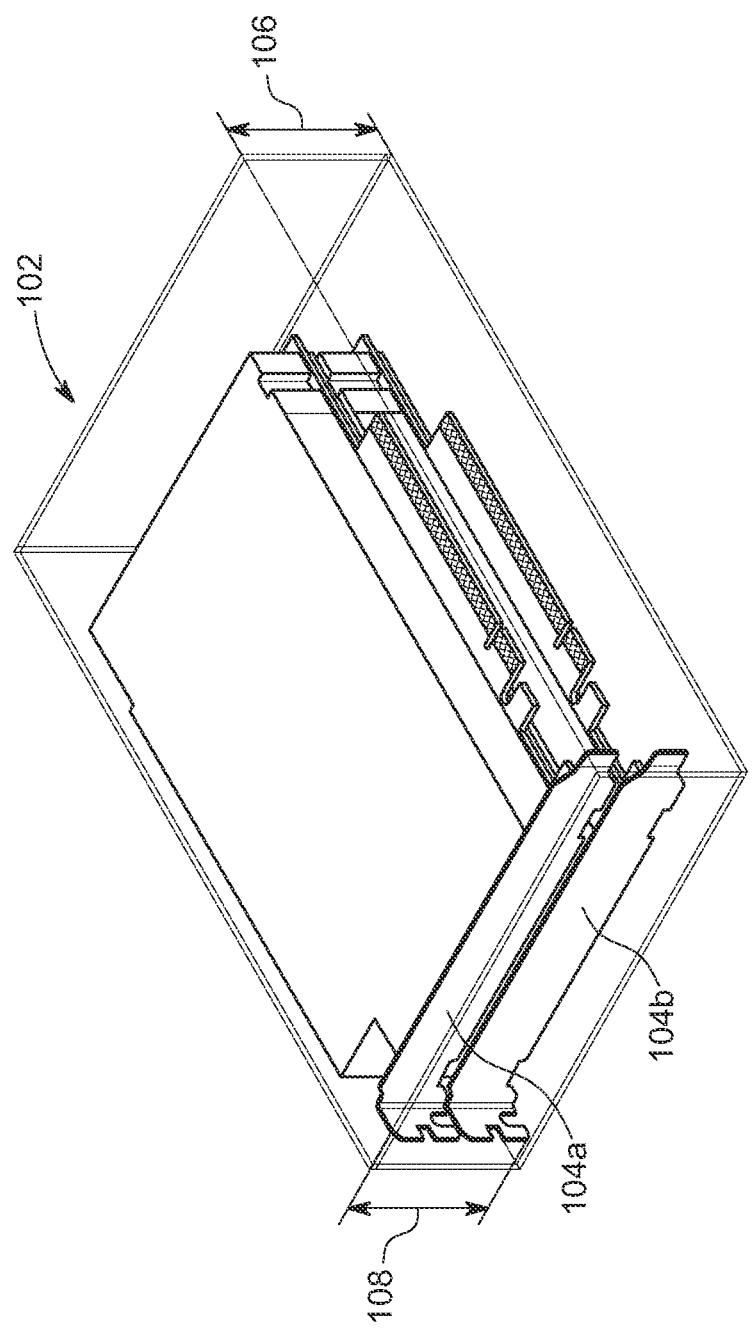
FIG. 1A is a perspective view showing a height of stacked PCIe cards in comparison to a height of a 1U server.

Embodiments of the present disclosure provide a peripheral component interconnect express (PCIe) bracket that fits within a PCIe tray. The PCIe bracket secures two vertically stacked PCIe cards. The PCIe cards are arranged in different directions to facilitate reducing a total height of the stacked PCIe cards. Arranging the stacked PCIe cards in this manner allows the PCIe cards to fit within a 1U server. As such, a computing system provided in accordance with embodiments of the present disclosure can better utilize space within computing systems with limited physical space.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially,"

"approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1A, a perspective view showing a double-layer height 108 of stacked PCIe cards 104a, 104b in comparison to an internal height 106 of a 1U server 102 is provided. The double-layer height of stacked full-height PCIe cards is typically 41.91 mm, which can easily fit into a 1U chassis having an internal height of 42.45 mm. That is, the internal height 106 is about 42.45 mm, and the double-layer height 108 is about 41.91 mm, thus the stacked PCIe cards 104a, 104b fit within the 1U server 102. The stacked PCIe cards 104a, 104b are full-height PCIe cards.

Figure 1B:
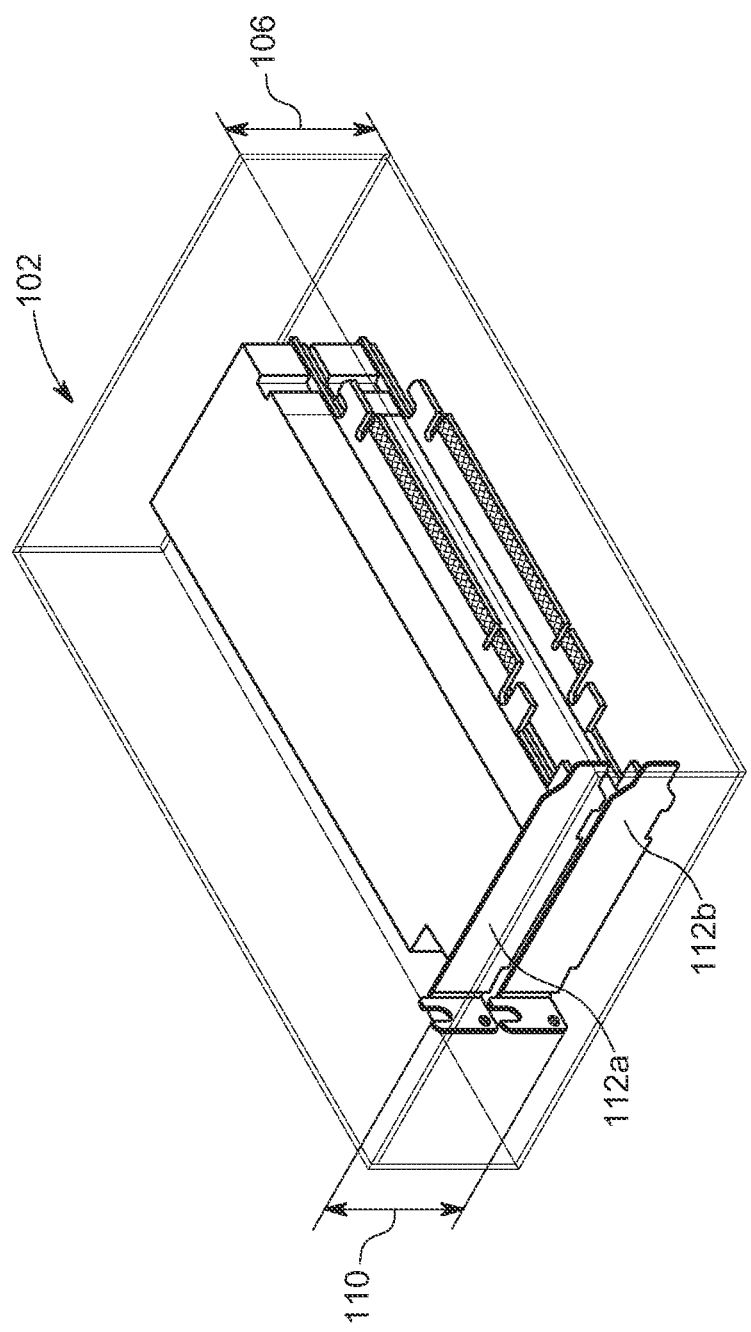
FIG. 1B is a perspective view showing a height of another stacked PCIe cards in comparison to the height of the 1U server.

Referring to FIG. 1B, a perspective view showing a double-layer height 110 of another stack of PCIe cards 112a, 112b in comparison to the internal height 106 of the 1U server 102 is provided. In contrast to the full-height PCIe cards, the double-layer height of a half-height PCIe card is 44.13 mm, exceeding the height limitation of a 1U chassis. That is, the internal height 106 is about 42.45 mm, and the double-layer height 110 is about 44.13 mm, therefore, unable to fit within the 1U server 102 as arranged. The stack of PCIe cards 112a, 112b are half-height PCIe cards.

Figure 2:
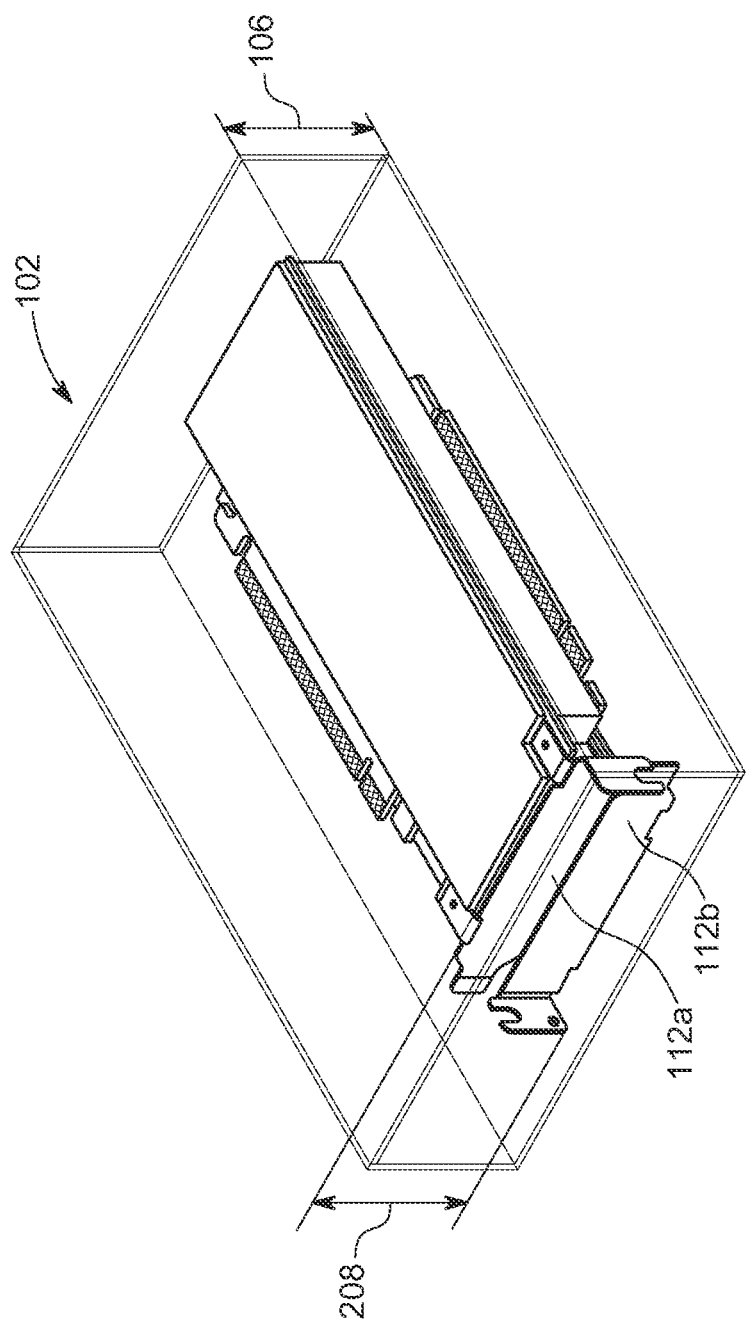
FIG. 2 is a perspective view showing a height of the other stacked PCIe cards in comparison to the height of the 1U server when arranged according to certain aspects of the present disclosure.

Referring to FIG. 2, a perspective view showing a double-layer height 208 of the stack of PCIe cards 112a, 112b in comparison to the internal height 106 of the 1U server 102 when the stack of PCIe cards 112a, 112b is arranged according to certain aspects of the present disclosure. The double-layer height 208 is about 40.96 mm, which is less than the 42.45 mm of the internal height 106. Thus, the stack of half-height PCIe cards 112a, 112b fit within the 1U server 102. The arrangement of FIG. 2 is different from that of FIG. 1B in that the first PCIe card 112a is flipped in FIG. 2 compared with FIG. 1B.

Figure 3:
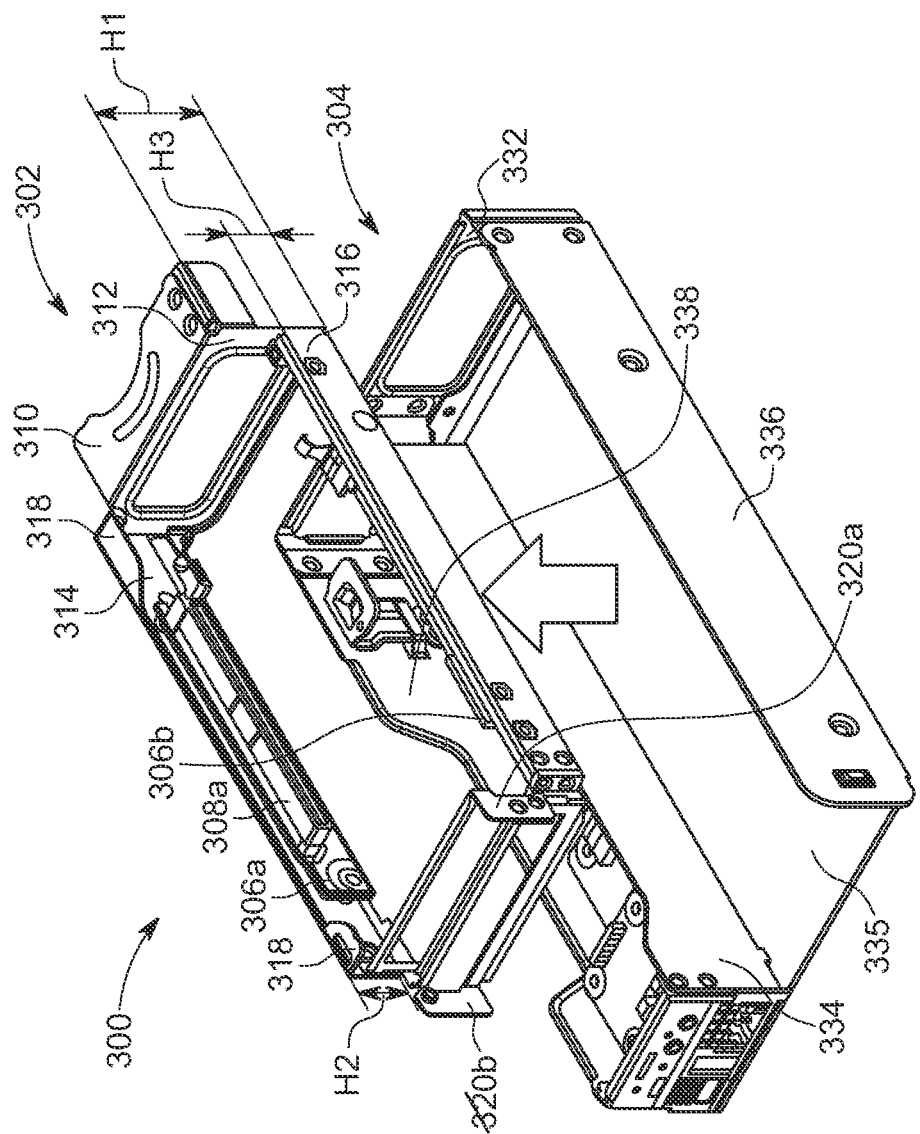
FIG. 3 is a perspective view of a PCIe tray and bracket combination, according to certain aspects of the present disclosure.

Referring to FIG. 3, a perspective view of a PCIe tray and bracket combination 300 is provided, according to certain aspects of the present disclosure. The PCIe tray and bracket combination 300 includes a tray 304 and a bracket 302. The bracket 302 is removable from the tray 304.

The bracket 302 is configured to hold two PCIe cards. The bracket 302 includes printed circuit boards (PCBs), e.g., a first PCB 306a and a second PCB 306b. Each PCB includes a connector (e.g., PCIe connector 308a) for connecting to a PCIe card. The bracket 302 includes a first bracket sidewall 314 and a second bracket sidewall 316, with the first PCB 306a secured to an inside surface of the first bracket sidewall 314 and the second PCB 306b secured to an inside surface of the second bracket sidewall 316. The first bracket sidewall 314 attaches to a first PCIe securing tab 320a, and the second bracket sidewall 316 attaches to a second PCIe securing tab 320b. PCIe securing tabs interface with PCIe height brackets to mechanically secure PCIe cards.

The bracket 302 further includes a bracket backwall 312. The first bracket sidewall 314 and the second bracket sidewall 316 attach to opposite ends of the bracket backwall 312. In some implementations, along a diagonal, the first bracket sidewall 314 attaches to an opposite corner of the bracket backwall 312 compared to the corner where the second bracket sidewall 316 is attached. The bracket backwall 312 includes an opening for routing. In some implementations, the opening is a single opening such that the bracket backwall 312 is rectangular with a single oval opening, or rectangular with a rounded rectangular opening.

Portions of the bracket backwall 312 not devoted to the opening provide surfaces for coupling sidewalls (e.g., the first and second bracket sidewalls 314, 316) and a handle 310. The handle 310 can extend from an outer surface of the bracket backwall 312 while the first and second bracket sidewalls 314, 316 extend from an inner surface of the bracket backwall 312. In some implementations, a height of the bracket backwall 312 (H1) can be twice the height of either of the first bracket sidewall 314 (H2) or the second bracket sidewall 316 (H3). In some implementations, the height of the bracket backwall 312 is about the size of two PCIe cards. In some implementations, the second bracket sidewall 316 is positioned along a bottom portion of a first edge of the bracket backwall 312 such that there is space for receiving a PCIe card along a top portion of the first edge. The first bracket sidewall 314 is positioned along a top portion of a second edge of the bracket backwall 312 such that there is space for receiving a PCIe card along a bottom portion of the second edge. The first edge and the second edge are opposite edges on the bracket backwall 312. In some implementations, the first bracket sidewall 314 and/or the second bracket sidewall 316 includes tabs 318 for setting height boundaries for components placed within the bracket 302.

The tray 304 is configured to receive the bracket 302. The tray can include a tray bottom 335, a first tray sidewall 334, a second tray sidewall 336, and a tray backwall 332. The first and second tray sidewalls 334, 336 and the tray backwall 332 cooperate with the tray bottom 335 to form a bounded space for the bracket 302 to sit. In some implementations, the bracket 302 can be placed in the tray 304 or removed from the tray 304 using the handle 310. Similar to the bracket backwall 312, the tray backwall 332 may include one or more openings for cable routing. Positioning of the openings of the tray backwall 332 can match those of the openings of the bracket backwall 312.

In some implementations, the tray 304 includes multiple compartments such that the first and second tray sidewalls 334, 336 and the tray backwall 332 cooperate with the tray bottom 335 to form a first compartment for receiving the bracket 302. A second compartment for receiving or situating other electronic components can be formed as well. For example, the first tray sidewall 334 can act as a separator that separates two compartments, with the bracket 302 positioned in one compartment and other electronics positioned in a second compartment formed by a third tray sidewall 338, the first tray sidewall 334, and the tray backwall 332.

Figure 4:
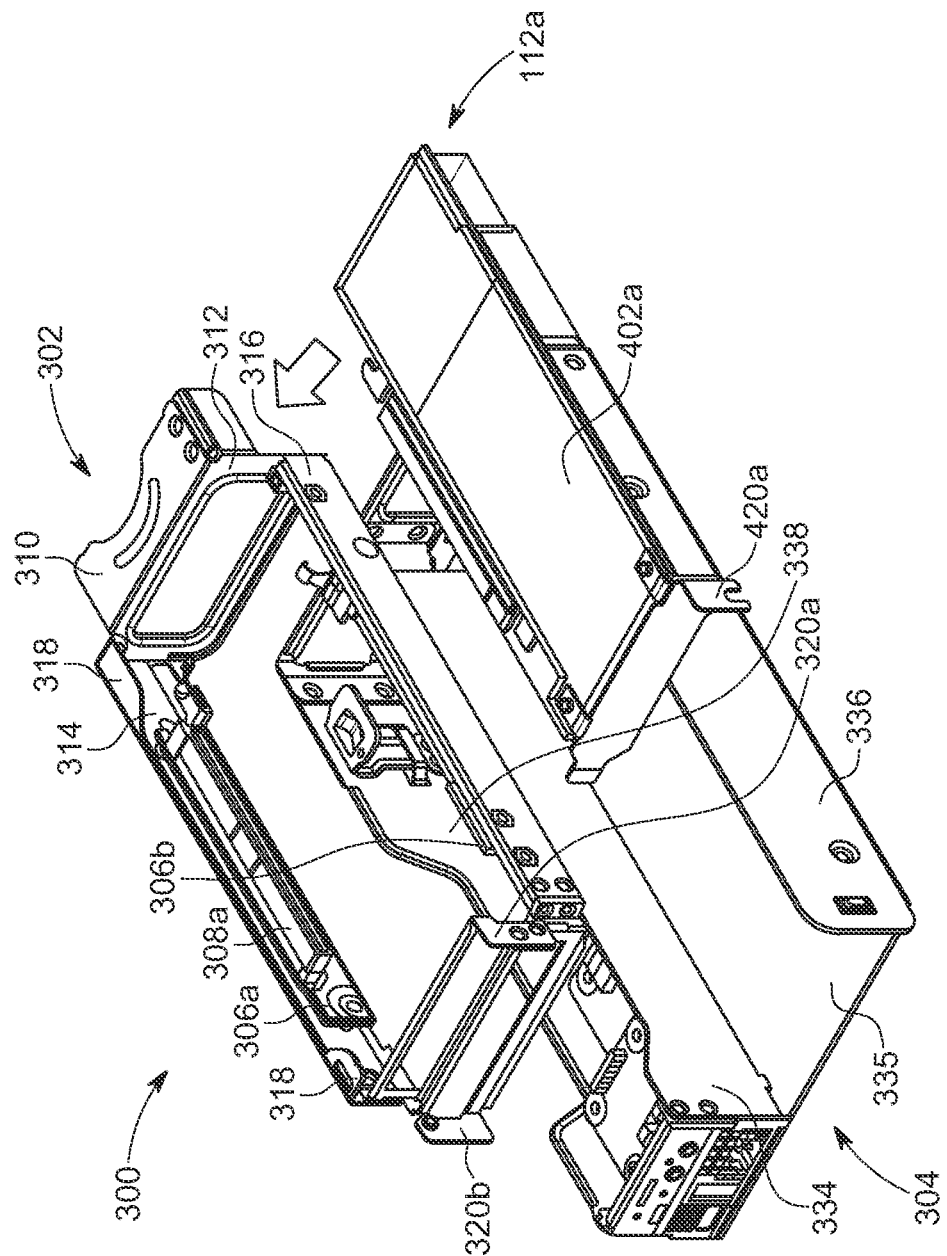
FIG. 4 illustrates inserting a first PCIe card in a PCIe bracket, according to certain aspects of the present disclosure.

Referring to FIG. 4, the first PCIe card 112a is inserted in the bracket 302, according to certain aspects of the present disclosure. The first PCIe card 112a is positioned such that a normal of a bottom surface 402a of the first PCIe card 112a points away from an inner surface of the tray bottom 335. The first PCIe card 112a includes a PCIe height bracket 420a that interfaces with the first PCIe securing tab 320a for securing the first PCIe card 112a.

Figure 5:
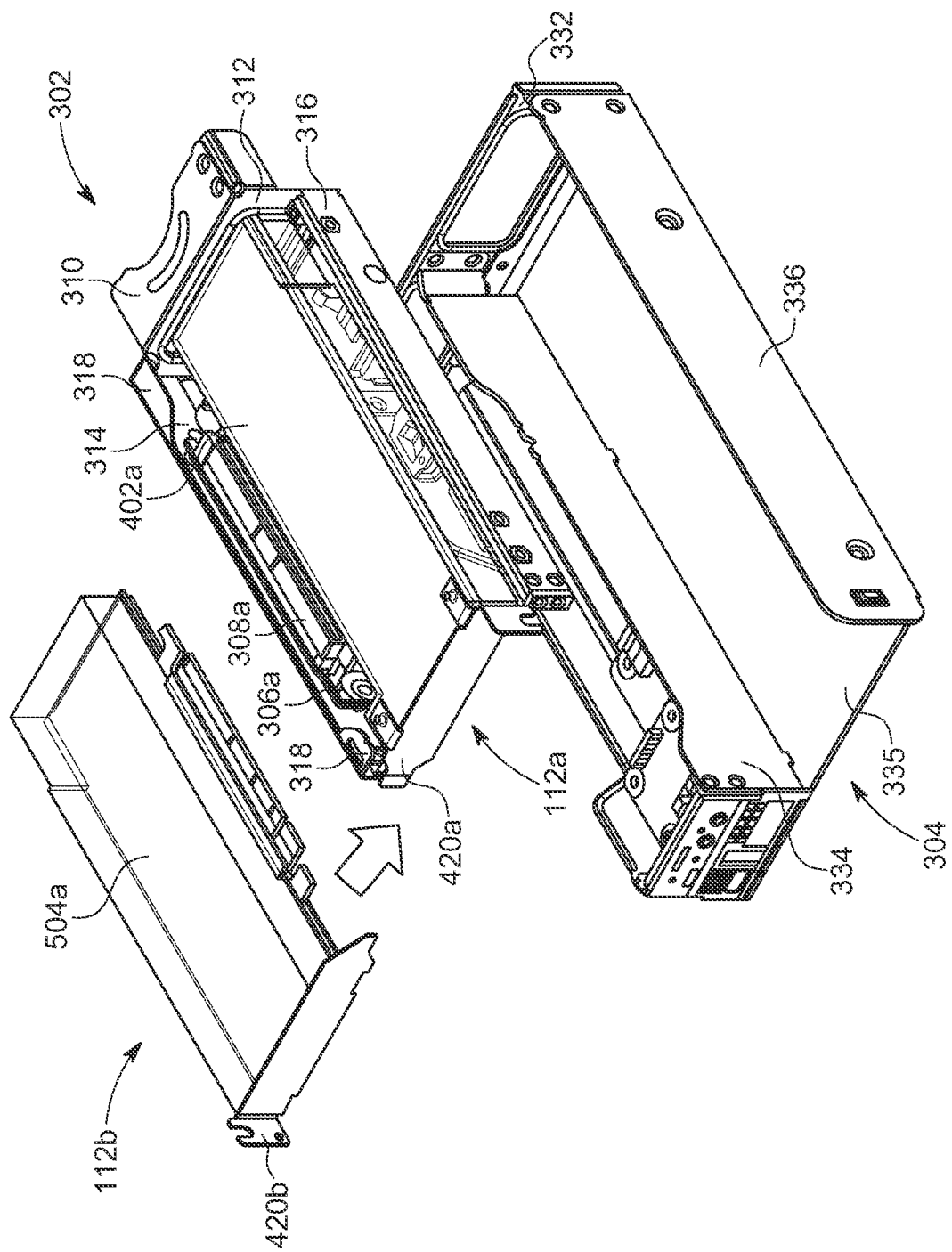
FIG. 5 illustrates inserting a second PCIe card in the PCIe bracket, according to certain aspects of the present disclosure.

Referring to FIG. 5, the second PCIe card 112b is inserted in the bracket 302, according to certain aspects of the present disclosure. The second PCIe card 112b is positioned such that a normal of a top surface 504a of the second PCIe card 112b points away from the inner surface of the tray bottom 335. The top surface 504a of the second PCIe card 112b faces a top surface of the first PCIe card 112a in this configuration. The second PCIe card 112b includes a PCIe height bracket 420b that interfaces with the second PCIe securing tab 320b. The second PCIe card 112b is inserted in a direction that is antiparallel to the direction the first PCIe card 112a was inserted.

Figure 6A:
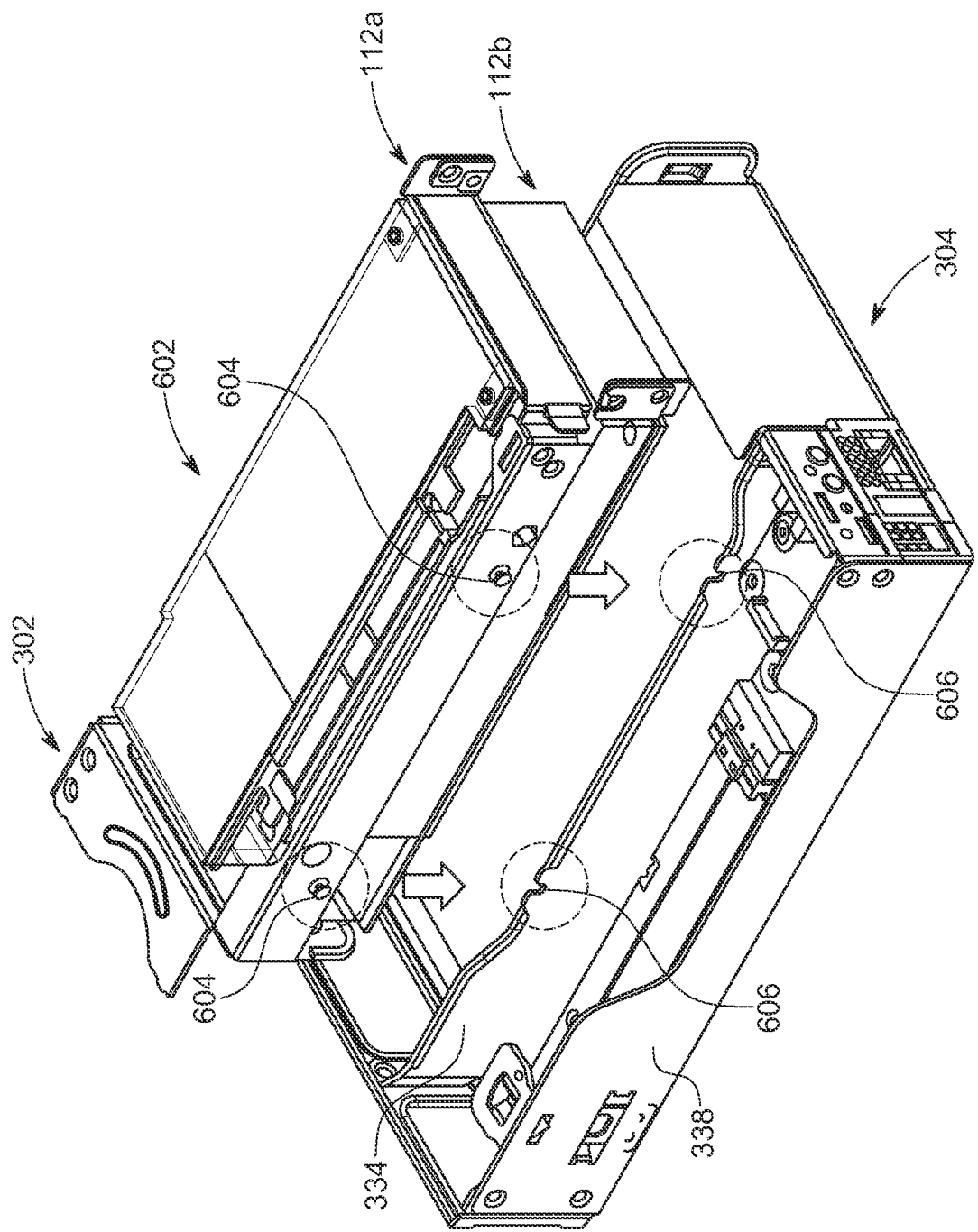
FIG. 6A is a front perspective view illustrating aligning the PCIe bracket with a PCIe tray, according to certain aspects of the present disclosure.
Figure 6B:
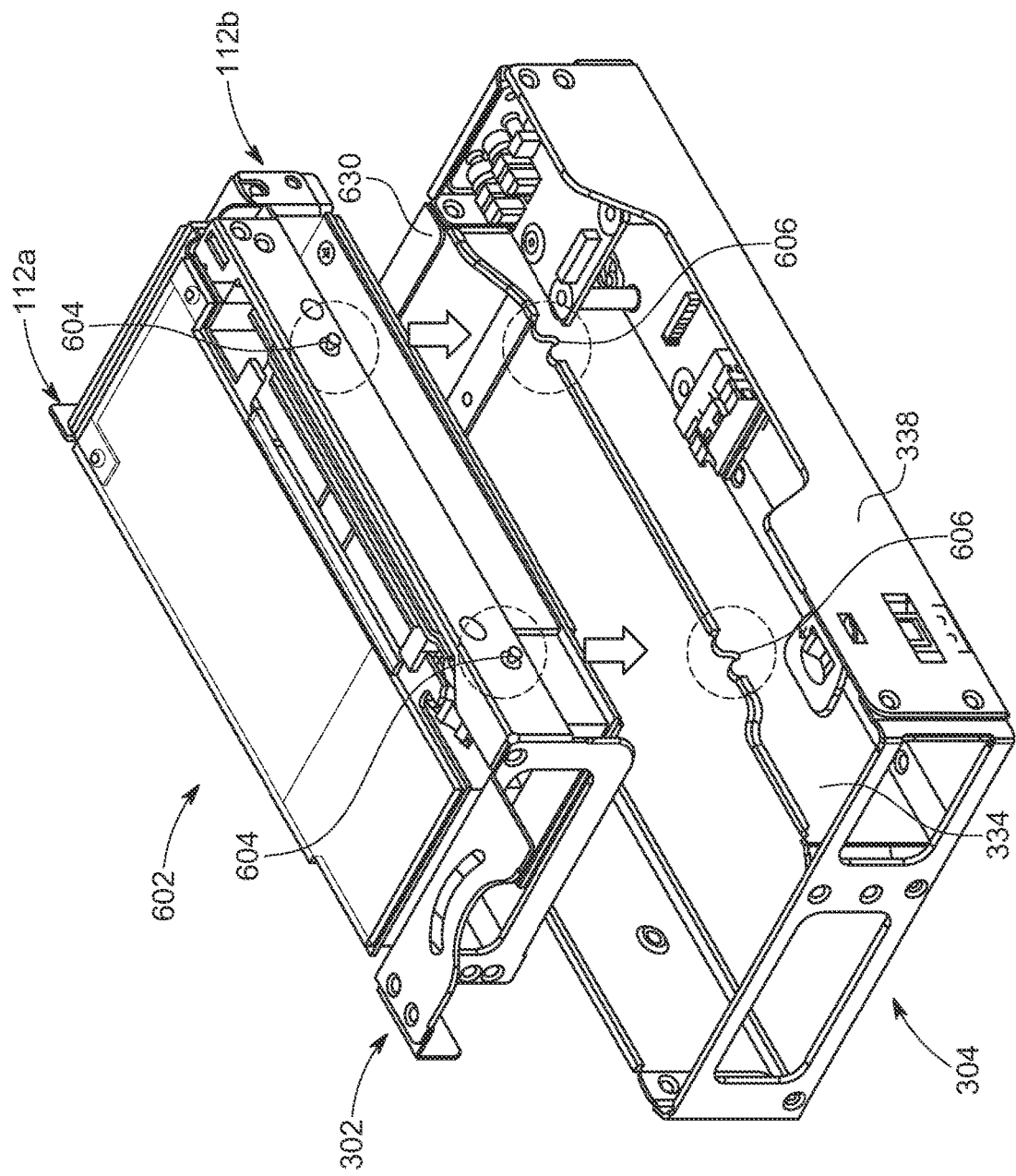
FIG. 6B is a back perspective view of FIG. 6A.

Referring FIG. 6A, a front perspective view illustrating aligning the bracket 302 with the tray 304 is provided, according to certain aspects of the present disclosure. After the first PCIe card 112a and the second PCIe card 112b are inserted in the bracket 302, the bracket 302 can be placed in the tray 304. Item 602 refers to the combination of the bracket 302 and the first PCIe card 112a and the second PCIe card 112b. The bracket 302 further includes knobs 604 that interface with notches 606 provided in the tray 304. The knobs 604 when received in the notches 606 hold the bracket 302 at a specific location in relation to the tray 304. FIG. 6B is a back perspective view of FIG. 6A, according to certain aspects of the present disclosure. In some implementations, the tray 304 includes a front cover 630.

Figure 7A:
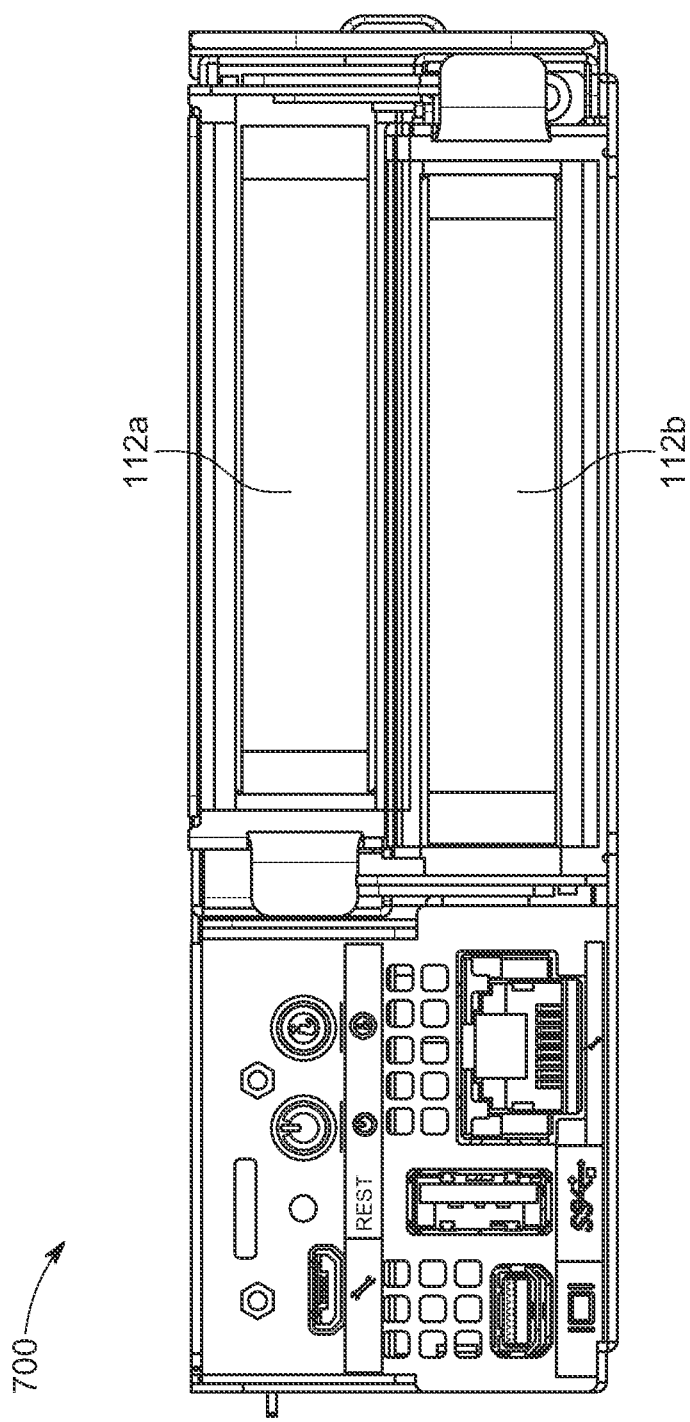
FIG. 7A is a front view showing the first PCIe card and the second PCIe card installed in the PCIe tray and bracket combination, according to certain aspects of the present disclosure.
Figure 7B:
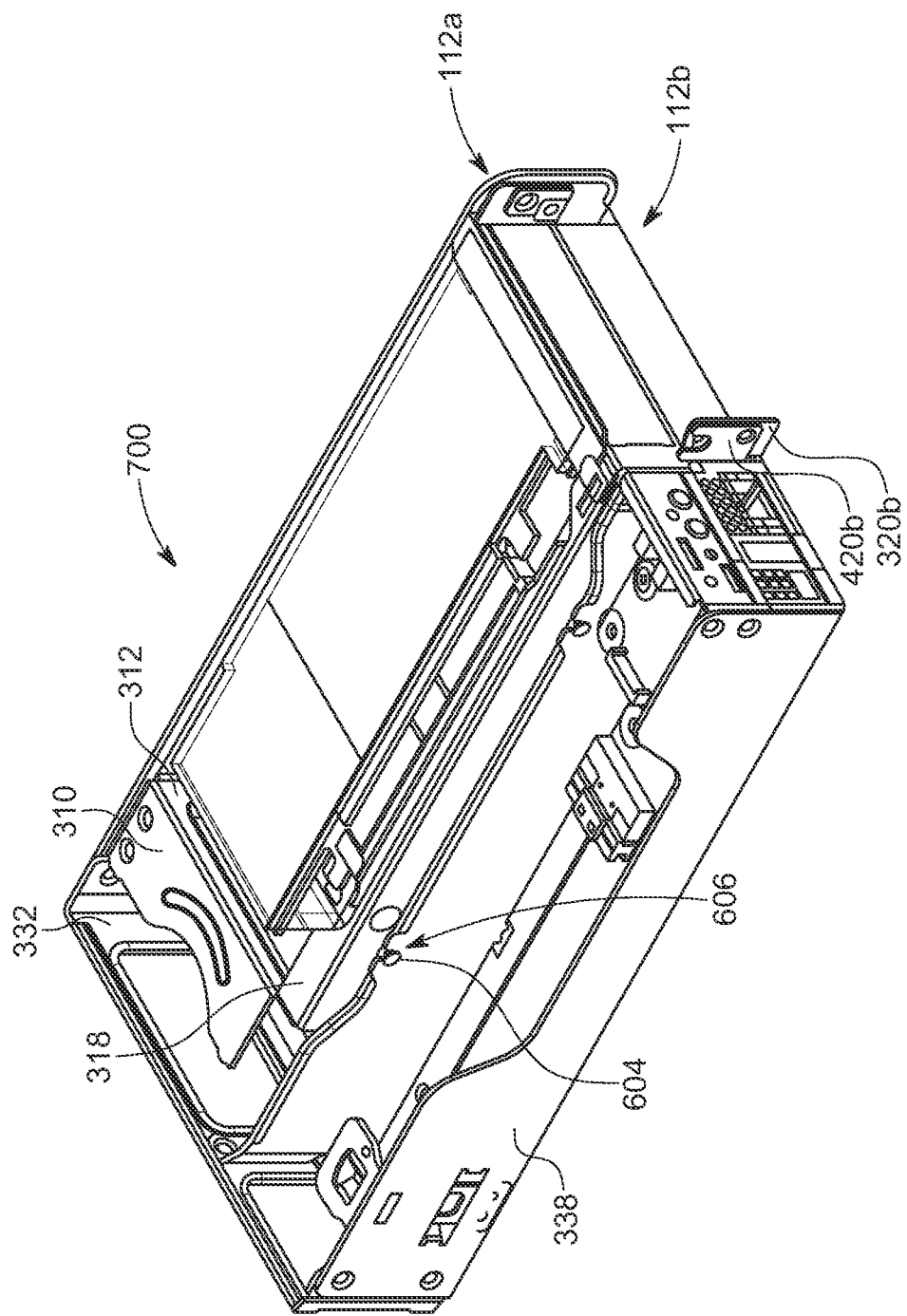
FIG. 7B is a front perspective view of FIG. 7A.

FIG. 7A is a front view showing the first PCIe card 112a and the second PCIe card 112b installed in the tray and bracket combination 700, according to certain aspects of the present disclosure. FIG. 7B is a front perspective view of FIG. 7A. In FIG. 7B, the knobs 604 are locked in the notches 606. FIG. 7C is a back perspective view of FIG. 7A. There is room between the handle 310 of the bracket 302 and the tray backwall 332 to receive a hand for removing the bracket 302 from the tray 304. The distance between the tray backwall 332 and the bracket backwall 312 is larger than the extension or overhang of the handle 310 from the bracket backwall 312.

Figure 8:
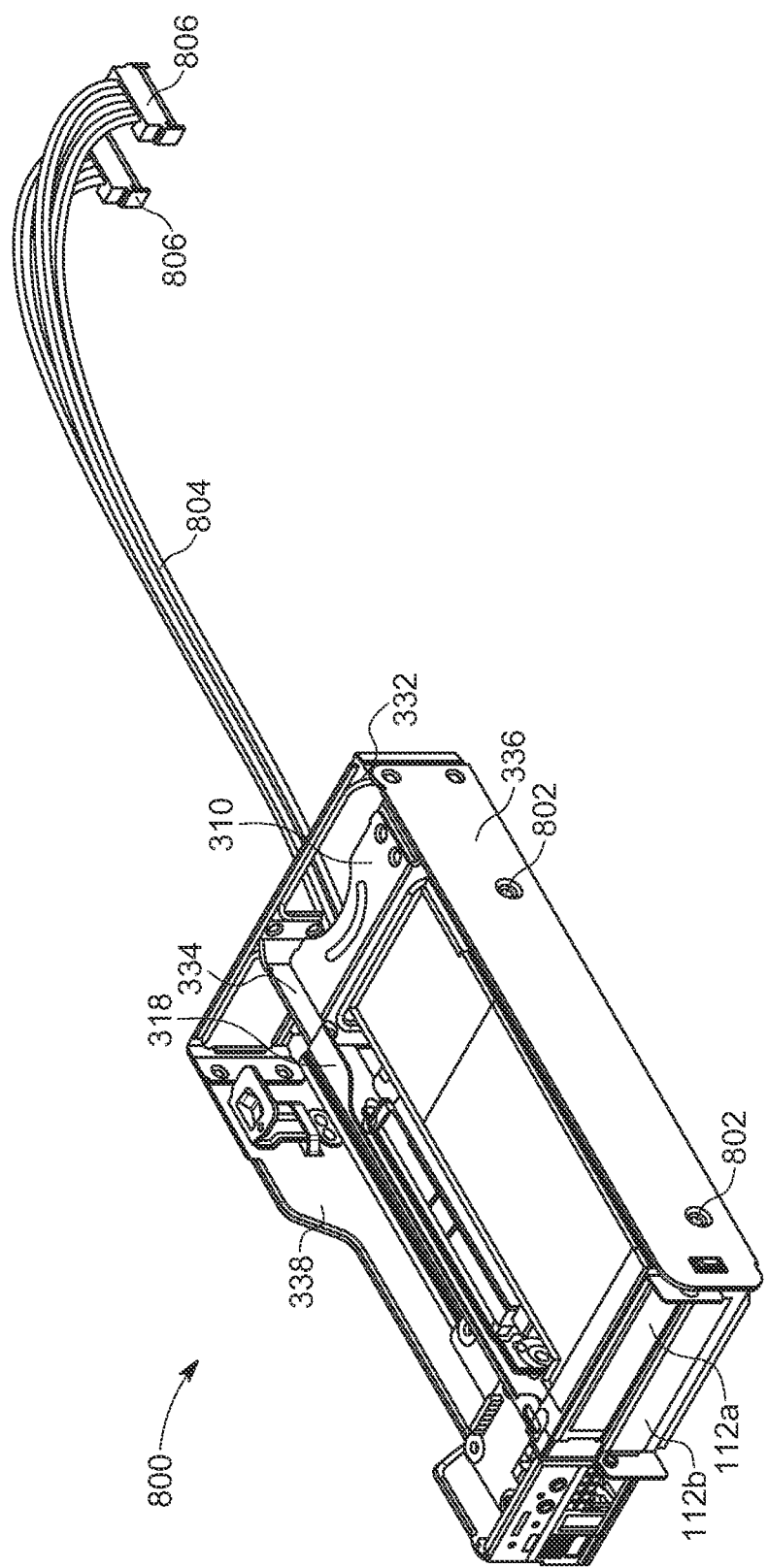
FIG. 8 is a perspective view showing cable connectivity to the first PCIe card and the second PCIe card, according to certain aspects of the present disclosure.

Referring to FIG. 8, a perspective view showing cable connectivity to the first PCIe card 112a and the second PCIe card 112b is provided, according to certain aspects of the present disclosure. A cable 804 connects to the first PCIe card 112a and the second PCIe card 112b via the first PCB 306a (FIG. 3) and the second PCB 306b (FIG. 3), respectively. The cable 804 has connectors 806 for connecting to a motherboard. Item 800 refers to the tray 304, the bracket 302 and the cable 804 combination. The bracket 302 can be secured to the tray 304 via fasteners 802. The fasteners 802 can be screws. The second bracket sidewall 316 can include holes for receiving the screws that penetrate both the second tray sidewall 336 and the second bracket sidewall 316.

Figure 9:
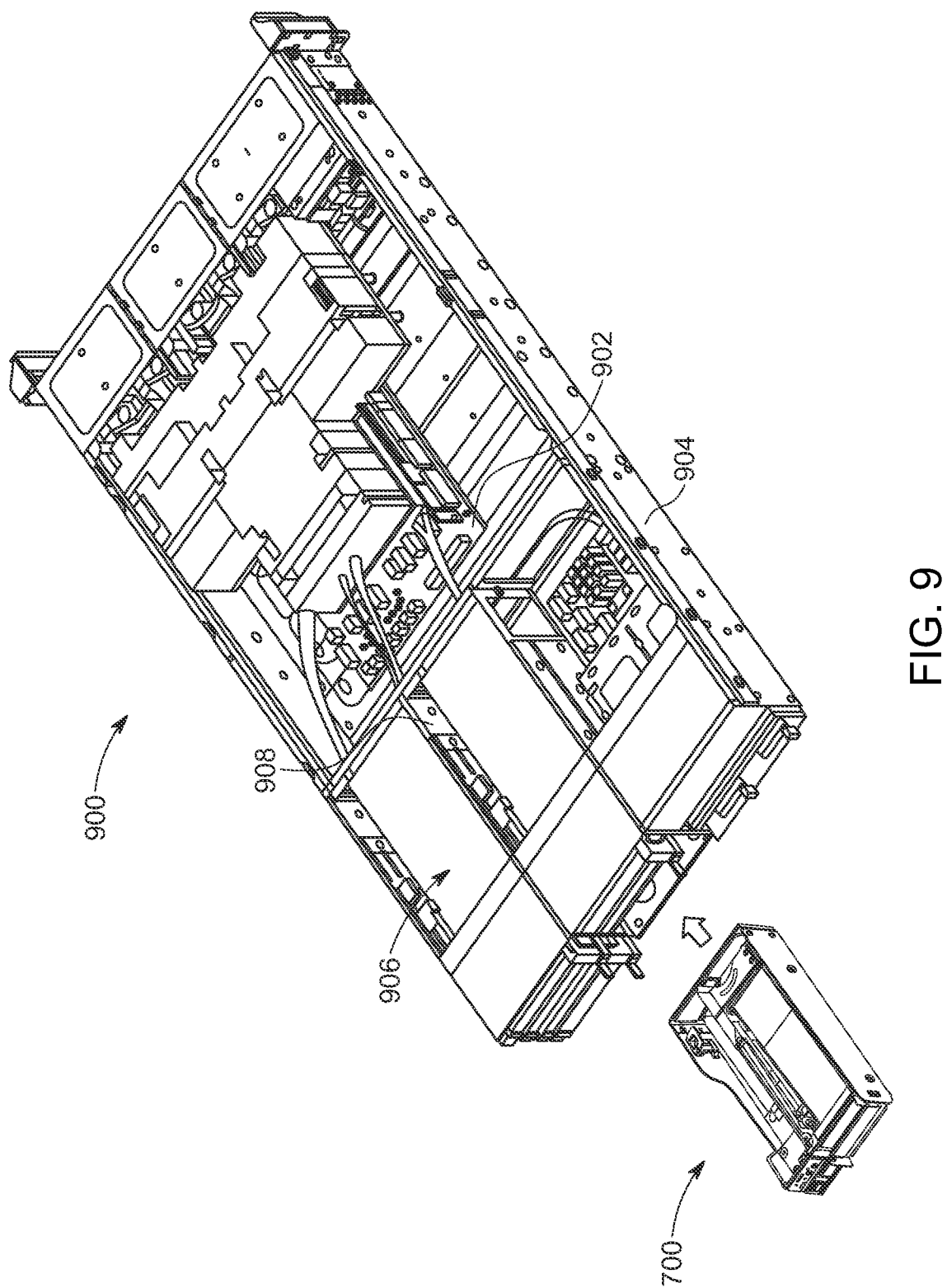
FIG. 9 is a perspective view showing insertion of the PCIe tray and bracket combination in a computing system, according to certain aspects of the present disclosure.

For example, FIG. 9 provides a perspective view showing insertion of the tray and bracket combination 700 in a computing system 900, according to certain aspects of the present disclosure. The computing system 900 includes a circuit board 902. The circuit board 902 can be a motherboard. The computing system 900 includes one or more tray compartments 906 for receiving electronic modules (e.g., expansion disks like hard drives, expansion cards like PCIe cards and riser cards, optical drives, etc.). The computing system 900 includes chassis 904 and internal system sidewall 908. The internal system sidewall 908 is an example system sidewall that separates two tray compartments 906. The tray 304 of the tray and bracket combination 700 interfaces with the internal system sidewall 908 when installing the tray and bracket combination 700 to the computing system 900. In some cases, the tray 304 slides along the internal system sidewall 908. That is, the internal system sidewall 908 can include guides that facilitate sliding the tray 304 into the chassis 904 of the computing system 900.

Figure 10:
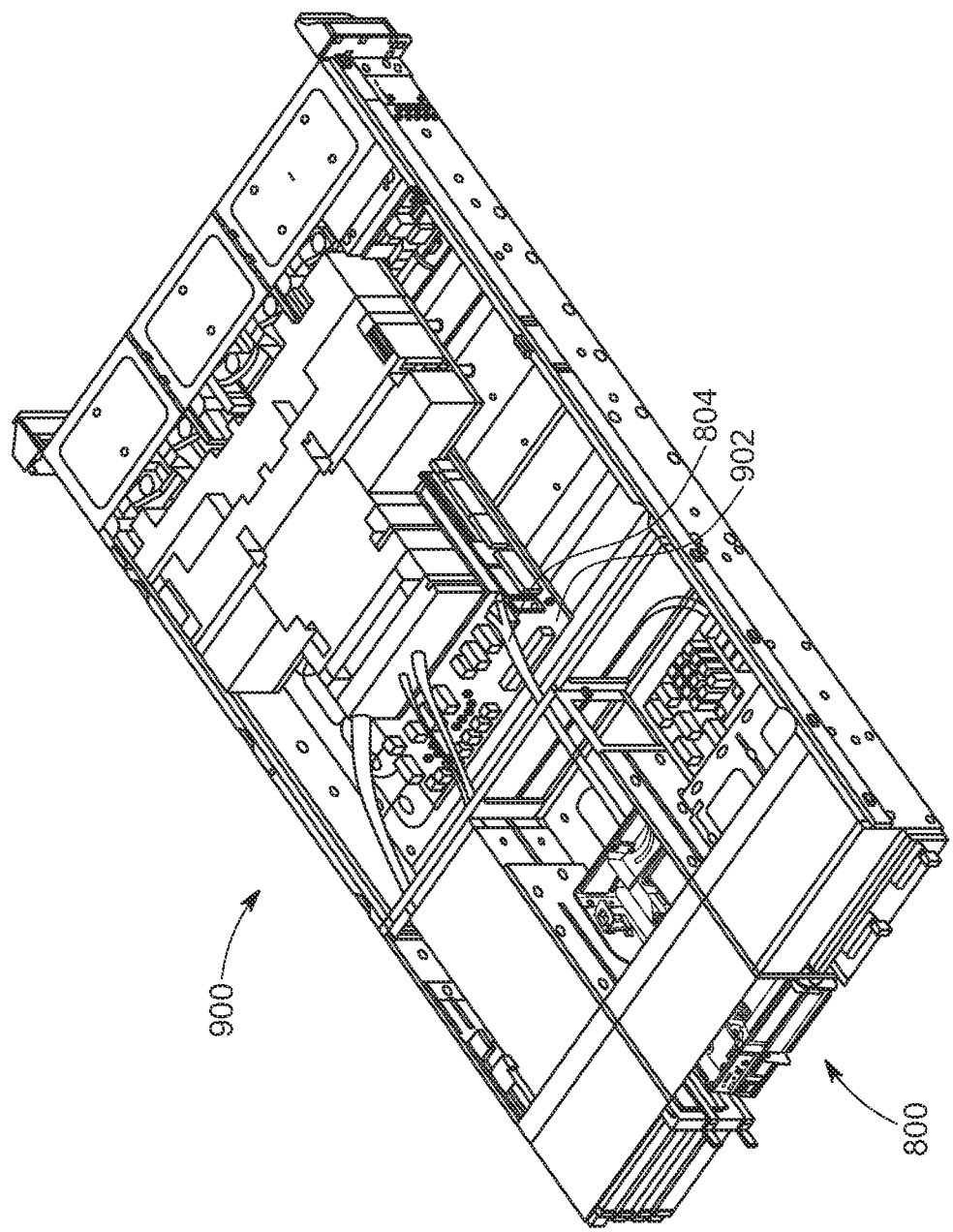
FIG. 10 is a perspective view showing connecting the PCIe tray and bracket combination to a circuit board of the computing system, according to certain aspects of the present disclosure.

FIG. 10 is a perspective view showing connecting the tray, bracket, and cable combination 800 to the circuit board 902 of the computing system 900, according to certain aspects of the present disclosure. The cable 804 connects to the circuit board 902 to electrically connect the first PCIe card 112a and the second PCIe card 112b to the circuit board 902.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A bracket for a computing device, the bracket comprising:
   a bracket backwall having a height H1;
   a first bracket sidewall coupled to a first corner of the bracket backwall, the first bracket sidewall having a height H2;
   a second bracket sidewall coupled to a second corner of the bracket backwall, the second corner being opposite the first corner along a diagonal of the bracket backwall, the second bracket sidewall having a height H2;
   a first PCIe securing tab extending from the first bracket sidewall towards the second bracket sidewall; and
   a second PCIe securing tab extending from the second bracket sidewall towards the first bracket sidewall, wherein the height H1 is approximately equal to a sum of the height H2 and the height H3.

2. The bracket of claim 1, further comprising a handle coupled to the bracket backwall.

3. The bracket of claim 1, wherein the bracket backwall includes an opening configured to receive a cable.

4. The bracket of claim 1, further comprising a first printed circuit board coupled to the first bracket sidewall, the first printed circuit board being configured to receive a first PCIe card.

5. The bracket of claim 4, further comprising a second printed circuit board coupled to the second bracket sidewall, the second printed circuit board being configured to receive a second PCIe card.

6. The bracket of claim 5, further comprising a cable coupled to both the first printed circuit board and the second printed circuit board.

7. The bracket of claim 5, wherein the height H2 or the height H3 is approximately the same as a thickness of a low profile PCIe card.

8. The bracket of claim 1, wherein the first bracket sidewall includes at least one knob for interfacing with a tray sidewall.

9. The bracket of claim 1, wherein the second bracket sidewall includes holes for coupling the bracket to a tray sidewall.

10. A computing device, comprising:
    a chassis;

a motherboard coupled to the chassis;
a tray removably coupled to the chassis; and
a bracket removably coupled to the tray, the bracket including:
  a bracket backwall having a height H1;
  a first bracket sidewall coupled to a first corner of the bracket backwall, the first bracket sidewall having a height H2;
  a second bracket sidewall coupled to a second corner of the bracket backwall, the second bracket sidewall having a height H3;
  a first PCIe securing tab extending from the first bracket sidewall towards the second bracket sidewall; and
  a second PCIe securing tab extending from the second bracket sidewall towards the first bracket sidewall,
  wherein the height H1 is approximately equal to a sum of the height H2 and the height H3.

11. The computing device of claim 10, further comprising:
  a first printed circuit board coupled to the first bracket sidewall, the first printed circuit board configured to receive a first PCIe card;
  a second printed circuit board coupled to the second bracket sidewall, the second printed circuit board configured to receive a second PCIe card; and
  a cable coupled to both the first printed circuit board and the second printed circuit board.

12. The computing device of claim 11, wherein the bracket backwall includes a first opening and the tray includes a tray backwall having a second opening, the cable passing through both the first opening and the second opening to connect the first printed circuit board and the second printed circuit board to the motherboard.

13. The computing device of claim 10, wherein the bracket further comprises a handle coupled to the bracket backwall.

14. The computing device of claim 10, wherein the first bracket sidewall includes at least one knob, and wherein the tray includes a first tray sidewall having notches, the at least one knob configured to be received in the notches.

15. The computing device of claim 10, wherein the second bracket sidewall includes at least one hole, and wherein the tray includes a second tray sidewall, the second tray sidewall coupled to the at least one hole of the second bracket sidewall via fasteners.

16. The computing device of claim 10, wherein the tray includes a first compartment and a second compartment, the first compartment housing the bracket and the second compartment housing a set of electronic components.

17. The computing device of claim 16, wherein the tray further includes a first tray sidewall separating the first compartment and the second compartment, the first tray sidewall being configured to couple to the first bracket sidewall.

18. A method for installing a first PCIe card and a second PCIe card to a computing device, the method comprising:
  inserting the first PCIe card in a bracket of the computing device from a first direction, the first PCIe card coupling to a first printed circuit board, the first printed circuit board being coupled to a first bracket sidewall of the bracket;
  inserting the second PCIe card in the bracket from a second direction, the second direction being antiparallel to the first direction, the second PCIe card coupling to a second printed circuit board, the second printed circuit board being coupled to a second bracket sidewall of the bracket;
  placing the bracket within a tray of the computing device; and
  placing the tray in the computing device.

19. The method of claim 18, further comprising mechanically coupling the bracket to the tray using fasteners.

20. The method of claim 18, wherein the first bracket sidewall and the second bracket sidewall are coupled to a bracket backwall, the bracket backwall having a height H1, the first bracket sidewall having a height H2, the second bracket sidewall having a height H3, the height H1 being approximately equal to a sum of the height H2 and the height H3.

* * * * *